(12) United States Patent
Boda et al.

(10) Patent No.: US 10,055,306 B1
(45) Date of Patent: *Aug. 21, 2018

(54) OPTIMIZED BACKUP OF CLUSTERS WITH MULTIPLE PROXY SERVERS

(71) Applicant: EMC IP Holding Company LLC, Hopkinton, MA (US)

(72) Inventors: Koteswara R. Boda, Redmond, WA (US); Abhishek Das, Seattle, WA (US); Matthew D. Buchman, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/583,813

(22) Filed: May 1, 2017

Related U.S. Application Data

(63) Continuation of application No. 14/229,000, filed on Mar. 28, 2014, now Pat. No. 9,639,428.

(51) Int. Cl.
*G06F 9/455* (2018.01)
*G06F 7/00* (2006.01)
*G06F 11/14* (2006.01)

(52) U.S. Cl.
CPC ...... *G06F 11/1458* (2013.01); *G06F 9/45533* (2013.01)

(58) Field of Classification Search
CPC ............. G06F 9/45533; G06F 11/1458; G06F 11/1464
USPC .............................. 718/1, 105; 707/640–660
See application file for complete search history.

(56) References Cited

U.S. PATENT DOCUMENTS

| | | |
|---|---|---|
| 7,100,089 B1 | 8/2006 | Phelps |
| 7,203,944 B1 | 4/2007 | Van Rietschote et al. |
| 7,716,667 B2 | 5/2010 | Van Rietschote et al. |
| 8,219,769 B1 | 7/2012 | Wilk |
| 8,769,226 B2 | 7/2014 | Wilk |
| 8,819,369 B1 | 8/2014 | Alappat et al. |
| 8,886,609 B2 | 11/2014 | Buragohain et al. |
| 2003/0126247 A1 | 7/2003 | Strasser et al. |
| 2003/0131278 A1* | 7/2003 | Fujibayashi ........ G06F 11/1469 714/6.3 |
| 2005/0102387 A1 | 5/2005 | Herington |
| 2006/0018505 A1 | 1/2006 | Cherian et al. |
| 2007/0130566 A1 | 6/2007 | Van Rietschote |
| 2007/0208918 A1 | 9/2007 | Harbin et al. |
| 2008/0126723 A1 | 5/2008 | Ashton et al. |
| 2010/0011178 A1* | 1/2010 | Feathergill .......... G06F 11/1466 711/162 |
| 2010/0299309 A1 | 11/2010 | Maki et al. |
| 2011/0197198 A1* | 8/2011 | Kanso .................. G06F 9/5083 718/105 |
| 2011/0252208 A1 | 10/2011 | Ali et al. |

(Continued)

*Primary Examiner* — Qing Chen
(74) *Attorney, Agent, or Firm* — Workman Nydegger (57) ABSTRACT

Systems and methods for backing up and restoring virtual machines in a cluster environment. Proxy nodes in the cluster are configured with agents. The agents are configured to perform backup operations and restore operations for virtual machines operating in the cluster. During a backup operation or during a restore operation, a load associated with the backup/restore operation is distributed across at least some of the proxy nodes. The proxy nodes can backup/restore virtual machines on any of the nodes in the cluster.

20 Claims, 4 Drawing Sheets

(56) References Cited

U.S. PATENT DOCUMENTS

| | | |
|---|---|---|
| 2012/0158662 A1 | 6/2012 | Buragohain et al. |
| 2012/0278287 A1 | 11/2012 | Wilk |
| 2013/0159984 A1 | 6/2013 | Misovski et al. |
| 2013/0166863 A1* | 6/2013 | Buragohain ........ G06F 11/1446 711/162 |
| 2014/0181804 A1 | 6/2014 | Sakata et al. |

* cited by examiner

OPTIMIZED BACKUP OF CLUSTERS WITH MULTIPLE PROXY SERVERS

CROSS-REFERENCE TO RELATED APPLICATIONS

The present application is a continuation of, and claims the benefit of U.S. Utility application Ser. No. 14/229,000 (now U.S. Pat. No. 9,639,428), filed Mar. 28, 2014 and entitled OPTIMIZED BACKUP OF CLUSTERS WITH MULTIPLE PROXY SERVERS, which application in incorporated herein by reference in its entirety.

BACKGROUND OF THE INVENTION

1. The Field of the Invention

Embodiments of the present invention relate to protecting data. More particularly, embodiments of the invention relate to systems and methods for backing up and/or restoring virtual machines.

2. The Relevant Technology

One of the simplest ways to protect data is to simply copy the data to a backup device. Computing systems today, however, often have very large amounts of data and the simple act of copying the data is inadequate for many reasons. First, copying the data in this manner can consume significant computing resources. Second, the original data may be unavailable for an extended period of time. As a result, more sophisticated methods for protecting data are needed.

The problems associated with protecting data are more complicated as the sophistication of the underlying computer environment increases. Clusters are an example of a sophisticated computing environment. A cluster typically includes various computing devices that work together and that can, in some examples, be viewed as a single system. Each computer or physical device in the cluster can be referred to as a node and each node can be configured to operate in various configurations. Some nodes, for example, may be configured to host one or more virtual machines.

One of the problems with clusters (e.g., such as may be found in datacenters) is that the ability to restore a node or a virtual machine is complicated. Conventionally, the data protection software must be installed on the node that is the subject of the backup/restore operation. For this reason, as the number of nodes in a cluster gets large, the backup/restore operations can become very cumbersome and complicated. The data protection processes are further complicated when considering that the node can be configured in various ways, including as a host for one or more virtual machines. The complexity increases when considering that clusters often use shared volumes.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF THE PREFERRED EMBODIMENTS

Embodiments of the invention relate to systems and methods for performing data protection operations (e.g., backup operations and/or restore operations for data). Embodiments further relate to systems and/or methods for backing up and/or restoring virtual machines and/or data associated with virtual machines. Embodiments further relate to systems and methods for protecting data in a cluster environment by load balancing backup and/or restore operations across one or more proxy nodes.

An example of a computing environment is a cluster. A cluster is a group of devices that are configured to work together and that may appear as a single system. Each computing device or each physical device may be a node of the cluster. Each node may be, by way of example only, configured as a server computer running server software or other computing device running other applications. Each node may support one or more virtual machines. The virtual machines can be configured as servers or provide other functionality.

A virtual machine is often instantiated in conjunction with a virtual machine manager (VMM) or a hypervisor layer. These layers perform various functions that enable one or more virtual machines to be instantiated on the node. In addition, the nodes may include or be associated with cluster shared volumes (CSVs). Cluster shared volumes allow a virtual machine to have mobility within a cluster environment in part because a CSV is configured such that any node can access the CSV and access the virtual hard drives (e.g., VHDs or other format) stored thereon. A virtual machine can migrate from one node to another, for example, in a cluster.

A cluster also includes cluster resources. Cluster resources exist on nodes in the cluster and can migrate between nodes in the cluster. A cluster resource can be a physical resource, a software resource or the like that can be owned by a node. In addition, the cluster resource can be managed in the cluster, taken online and/or offline. Further, a cluster resource may abstract the service being provided to the cluster. As a result, the cluster understands that a cluster resource is available and can be used by any node in the cluster. In one example, ownership of the cluster resource belongs to the node using the cluster resource. A node may obtain ownership of a cluster resource prior to using the cluster resource in some examples. A CSV may be an example of a cluster resource and can be owned by a node.

Embodiments of the invention can conduct backup and/or restore operations without installing components on a node related to the backup or restore operations. Multiple virtual machines on multiple nodes can be backed up or restored from proxy nodes. A proxy node typically includes an agent that is running on the proxy node. The agent is an example of a component of a data protection system and is installed on a proxy node (e.g., in the hypervisor) in the cluster. The agent is configured, in one example, to conduct backup/restore operation. The agent may also cooperate with a backup server to perform backup/restore operations.

The agent or other component of the data protection system may interact with a framework that may be present in or operating in the cluster. The framework may be a service provided by a host operating system for example and can be leveraged by a data protection system. The framework may provide, for example, the ability to take a snapshot of a virtual machine, an incremental snapshot of the virtual machine, or the like. As previously stated, the framework may be incorporated as a service in a guest operating system of a virtual machine. An example of such a service or framework, by way of example, is "Hyper-V Volume Shadow Copy Service" by Microsoft®. In one example, a single snapshot operation may be sufficient to perform a backup of an entire cluster. The framework may be invoked to perform a snapshot of one or more CSVs.

A node may be associated with one or more CSVs. A virtual machine running on a node may be associated with a VHD on a CSV. For example, a node may support more than one virtual machine and each virtual machine may be associated with a different CSV. Ownership of a CSV may change from one node to another node in a cluster. A virtual machine may not be aware of a change in the ownership of a CSV. This allows, for example, a proxy node to become the owner of the CSV during a backup or restore operation. When a virtual machine is backed up, ownership of the CSV associated with the virtual machine may be assigned to the proxy node and the agent operating on the proxy node may then backup the virtual machine.

In one example, changing the ownership of the CSV can optimize a data path to the CSV snapshots during a backup operation. When a proxy node has ownership of a CSV, the snapshot of the virtual machine is accessible as a physical disk to the owner of the CSV—the proxy node. Even though other nodes in the cluster may access the snapshot or, more generally, the CSV that is owned by the proxy node, the access to the snapshot or the CSV occurs over a network. As a result, ensuring that the proxy node has ownership of the CSV associated with the backup operation can optimize the data path to the CSV snapshot for the agent operating on the proxy node.

Thus, when a backup operation is performed, ownership of the CSVs involved in the backup operation is assigned to or obtained by the proxy nodes in the cluster. When multiple CSVs are involved, the backup load (e.g., the number of virtual machines or a size of data to be backed up from the CSVs) is balanced across the proxy nodes. For example, the backup load may be split between multiple proxy nodes.

Balancing the backup load can be performed in different ways. For example, the backup load could be randomly distributed by simply assigning the CSVs to the proxy nodes. Alternatively, the CSVs can be assigned to the proxy nodes in a manner that considers the amount of data on each CSV being backed up.

In one example, a list of all CSVs involved in a backup operation may be identified. The CSVs can be identified based on the virtual machines that are being backed up. In one example, once the virtual machines to be backed up have been identified, the CSVs on which the associated VHDs reside can be identified as well. The size of the data (e.g., the VM data such as configuration files, VHD files, aVHD files, differencing disks (or formatted files associated with various types of virtual machines)) to be backed up from each CSV may also be determined. By evaluating the data to be backed up, the overall size of the backup load can be evaluated and can be considered when balancing the backup load across the proxy nodes. After the backup load is determined, the backup load is balanced. The backup load may also be balanced based in part on the number of proxy nodes and/or the number of CSVs involved in the backup/restore operation.

For example, when backing up a virtual machine or when backing up multiple virtual machines, a call for backup of a virtual machine may be made by a requestor such as the agent operating on a proxy node. The call or request may alternatively originate from a backup server or a user or another device. The call may initiate at an agent that is operating on one of the nodes in the cluster. In one example, the node on which the agent is operating may be a proxy node and the virtual machine to be backed up resides on another node in the cluster. All virtual machines in the cluster can be backed up without having to install the backup application or portion thereof on each of the physical nodes. Rather, a proxy node or multiple proxy nodes can be used to backup/restore the virtual machines or other data in a computing environment such as a cluster.

Figure 1:
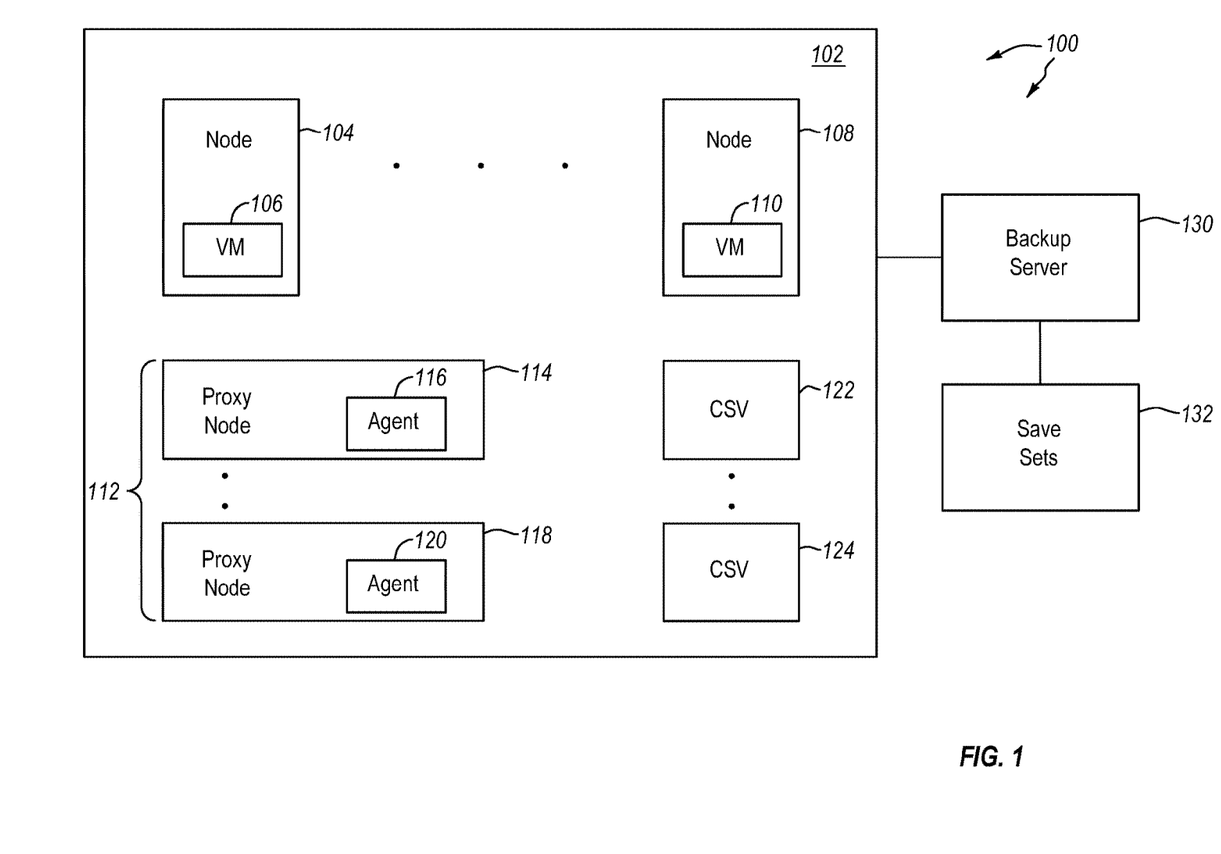
FIG. 1 illustrates an example of a data protection system capable of performing backup operations and restore operations for data in a computing environment.

FIG. 1 illustrates an example of a computing environment that includes a data protection system for backing up and/or restoring data. FIG. 1 also illustrates a data protection system capable of performing backup operations and restore operations for virtual machines in a computing environment such as a cluster. The data protection system may include various components or modules in the context of a cluster 102. The data protection system may include an agent (e.g., agent 116 and 118) that may be installed on a node in the cluster. The nodes on which the agent has been installed may be referred to as a proxy node. FIG. 1 illustrates the proxy nodes 112. Another component by be a backup server 130. The agents 116 and 118 can cooperate with the backup server 130 to backup the virtual machines and/or other data in the cluster 102. The backup operation generates save sets 132, which include the components that are saved and that can be used during a restore operation to restore data to the cluster or to restore a virtual machine as the virtual machine existed at a selected point in time.

More specifically, FIG. 1 illustrates a computing environment 100 that includes a cluster 102. The cluster includes multiple nodes, illustrated as nodes 104, 108, 114, and 118. The nodes 114 and 118 are configured as proxy nodes 112 in this example. In the context of backup/restore operations, a proxy node includes an agent that is installed thereon. An agent 116 is installed on the proxy node 114 and an agent 120 is installed on the proxy node 118. The proxy nodes 114 and 118, however, are similar to the nodes 104 and 108 and can support virtual machines as well. The number of the proxy nodes 112 is not fixed and can vary if necessary.

The agent 116 on the proxy node 114 and the agent 120 on the proxy node 118 may be configured to cooperate with a backup server 130 to backup and restore data such as the virtual machines 106 on the node 104 and/or the virtual machine 110 on the node 108 and or virtual machines running on the proxy nodes 112 themselves.

A virtual machine includes a virtual hard disk (e.g. VHD, VHDx, aVHD or other format). These file formats are similar to physical hard disks and include similar information. Some of the data, such as the VHDs, differencing disks, snapshots, or the like associated with the virtual machines 106 and 110 may be stored on the cluster shared volume (CSV) 122 or 124. The virtual hard disks associated with the virtual machines in the cluster 102 may be mounted in the CSVs 122 and 124.

The data protection system includes, in one example, a backup server 130 that can cooperate with the agents 116 and 118 to backup and/or restore data or virtual machines in the cluster 102. In fact, the backup server 130 may be running on a node of the cluster 102 or may be separate from the cluster 102. The backup server 130 is associated with save sets 132, which may be stored in the cluster 102 or separate from the cluster 102. The save sets 132 are the data or files that are actually backed up by the agents in the cluster. Each save set may include one or more files or components and each save set may correspond to a particular virtual machine. The contents of each save set may include configuration files, a copy of a snapshot, differencing disks or differencing snapshots (e.g., incremental changes from an initial snapshot), differencing configuration files and other components of virtual machines that are necessary to restore the virtual machines.

Thus, the save sets 132 include one or more backups of the data in the cluster 102. More specifically, the save sets 132 may include backups of virtual machines. Each of the save sets 132 may include full backups, full incremental backups, incremental backups, or the like or combination thereof of the virtual hard drives, configuration files, and other components of a virtual machine. The backup server 130 is robust and allows data to be restored to various points in time based on the save sets 132. This is possible in part because the save sets 132 may include incremental backups.

Figure 2:
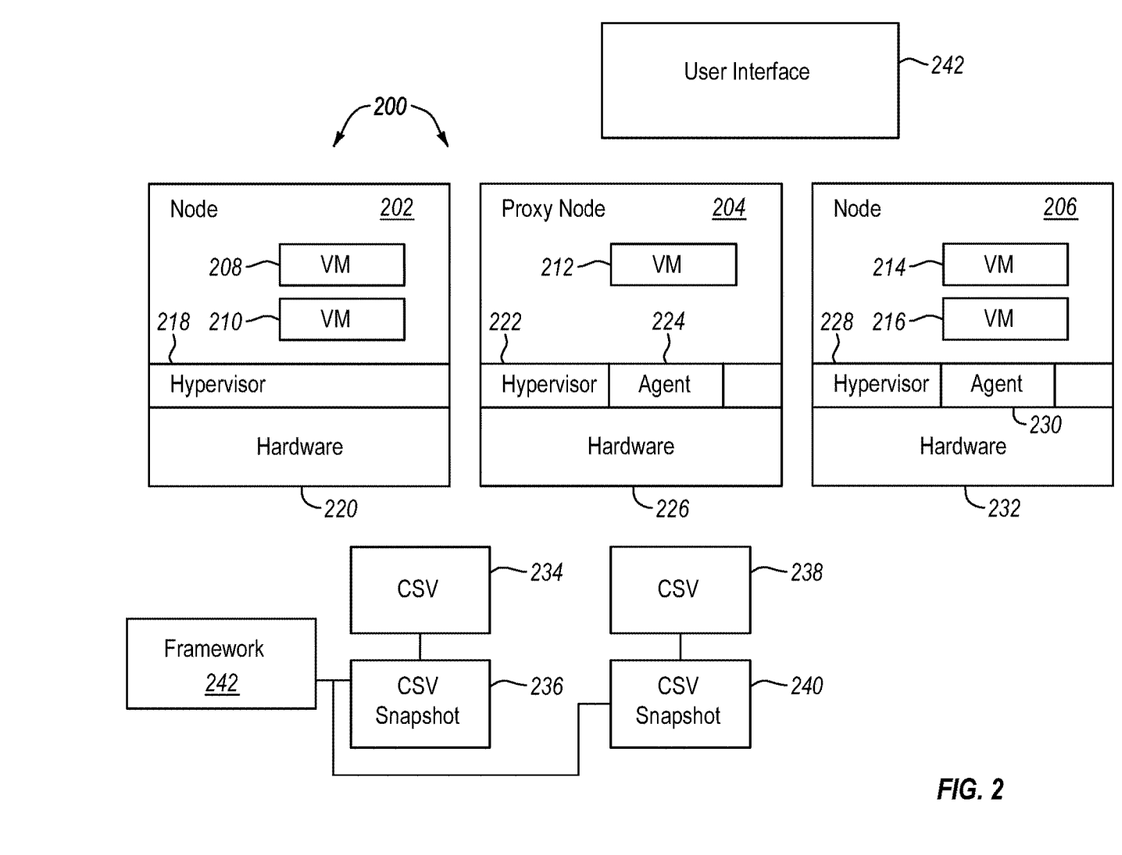
FIG. 2 illustrates an example of a cluster in which backup and restore operations may be performed from a proxy node and in which the backup or restore operation is load balanced across one or more proxy nodes.

FIG. 2 is a more detailed example of a cluster in which backup and restore operations may be performed by an agent installed on a proxy node or by agents installed on proxy nodes. FIG. 2 also illustrates that a backup operation of multiple virtual machines running on the nodes in the cluster is balanced across the proxy nodes in a cluster 200.

FIG. 2 illustrates that the cluster 200 includes nodes 202, 204 and 206. Each node includes a hypervisor (hypervisors 218, 222, and 228) and each node is associated with hardware (e.g., a computing device illustrated as hardware 220, 226, and 232)). Thus, the node 202 includes a hypervisor 218 running on hardware 220, the node 204 includes a hypervisor 222 running on hardware 226, and the node 206 includes a hypervisor 228 running on the hardware 232.

In this example, the node 202 supports a virtual machine 208 and a virtual machine 210. The node 202 supports a virtual machine 212 and the node 206 supports the virtual machines 214 and 216. Each node could support additional virtual machines and there may be other nodes in the cluster 200 that also support virtual machines. The embodiments disclosed herein can be scaled to accommodate larger numbers of nodes and corresponding virtual machines.

In this example, the node 204 includes an agent 224 in the hypervisor 222 and is thus a proxy node. The node 206 also includes an agent 230 in the hypervisor 228 and is also a proxy node. During a backup or restore operation, one of the proxy nodes may operate as a primary proxy node while the other proxy nodes operate as secondary proxy nodes. Any of the proxy nodes may be the primary proxy node.

The virtual machines 208, 210, 212, 214, and 216 can be backed up at the same time or at different times by one agent or by multiple agents working together. The virtual machines illustrates in FIG. 2 are associated with CSVs 234 and 238. In other words, the virtual hard drives associated with the virtual machines 208, 210, 212, 214, and 216 may be mounted on the CSVs 234 and 238.

The following discussion illustrates an example where all of the virtual machines in the cluster 200 are backed up during a backup operation.

When the backup operation is performed, the request to backup the virtual nodes may be initiated by the backup server, a user, or by an agent (e.g., the agent 224 or the agent 230) on one of the proxy nodes 204 and 206. When the request is made, a framework 242 may perform a snapshot in response to the request. The snapshot actually taken could be a full snapshot or an incremental snapshot and may depend on previous backup operations in some examples.

In one example, the agent 224 may make the request to backup certain virtual machines. The framework 242, in response to the request, may generate a snapshot of the virtual machines or of the CSVs associated with the virtual machines. In other words, it may be possible to take a snapshot of a virtual machine (e.g., the virtual machines VHD) or of the entire CSV. The framework 242 may report results of the snapshot to the requestor. The results could include an identification and location of the snapshot, a configuration file, and other components. In another example, the configuration of the virtual machine may be acquired independently of the framework. In this context, the proxy node 204 may be a primary proxy node and other proxy nodes associated with the backup operation may be secondary proxy nodes.

The request for a snapshot made by the agent 224 may be made to backup specific virtual machines. By identifying certain virtual machines in one example, a snapshot of those virtual machines is performed. The framework 242 may determine which CSVs are associated with the virtual machines identified in the request and perform a snapshot of those CSVs or of the relevant virtual hard drives mounted thereon.

In one example, a snapshot 236 is made of the CSV 234 and a snapshot 240 is made of the CSV 238. The CSVs 234 and 238 are associated with the virtual machines 208, 210, 212, 214, and 216 in this example. The snapshot 236 may include only data specific to the virtual machines being backed up or may be associated with the CSV as a whole without specific regard to the virtual machines being backed up. In one example, the framework will allow the virtual machines to quiesce prior to performing the snapshot.

After the snapshots 236 and 240 are completed, the results of the snapshot operation (e.g., the components of the virtual machine) are reported to the agent 224 by the framework 242. The agent 224 may then identify all of the CSVs that are associated with the backup operation. The agent 224 can determine which CSVs are associated with the snapshots 236 and 240. During the backup operation and based on this information, the agent 224 may reassign ownership of the CSVs 234 and 238 to the proxy nodes. The agents on the proxy nodes then backup the virtual machines from the snapshots 236 and 240.

For example, ownership of the CSV 234 may be assigned to the node 204 or to the agent 224 at some point during the backup operation. Ownership of the CSV 238 may be reassigned to the node 206 or the agent 230 during the backup operation.

The data or files associated with backing up the virtual machines corresponds to a backup load. In order to facilitate the backup operation, the CSVs involved in or associated with the backup operation may be sorted, for example, in a list. The CSVs may be sorted based on size of the virtual machine data to be backed up or the like. The size of the data being backed up from the CSVs may be different for each CSV. The size and location of the virtual machines (or components to be backed up) for which backup is requested can determine the size of the data be to backed up from each CSV. For example, the CSV 234 may be associated with the virtual machines 208, 210 and 212 while the virtual machines 214 and 215 may be associated with the CSV 238. Thus the data to be backed up from the CSV 234 is different in size from the data to be backed up from the CSV 238.

Once the backup operation is ready to proceed, the backup load is distributed to the proxy nodes. In this example, the backup of the virtual machines 208, 210, 212, 214, and 216 is performed by the agent 224 and the agent 230 in cooperation with the backup server. The backup operation may be federated in one example and may occur in parallel.

For instance, the virtual machines 208 and 212 may be backed up by the agent 224. The virtual machines 210, 214 and 216 may be backed up by the agent 230. In one example, the determination of which virtual machines are backed up by which agent may depend on the location of the virtual machines. More specifically, all virtual machines residing on a particular CSV are typically backed up by the same agent.

More specifically, an agent such as the agent 224 may be assigned to backup virtual machines that are associated with the CSV 234 and the agent 230 may be assigned to backup the virtual machines that are associated with the CSV 238. As a result of these assignments, the virtual machines backed up by the agent 224 and the virtual machines backed up by the agent 230 may depend on which CSVs are associated with the virtual machines. To perform the backup operation, the data or components of each virtual machine associated with the backup operation (e.g., the VHDs, aVHDs, configuration files, differencing disks, or the like) are backed up as a save set for each virtual machine Before backing up the virtual machines, however, the backup load is balanced or distributed. Balancing the backup load may depend on various factors such as by way of example, the number of virtual machines relative to the number of proxy nodes, the number of CSVs involved relative to the number of proxy nodes, the size of data on each of the CSVs, or the like or combination thereof.

As an example of optimization, when the number of proxy nodes is less than the number of CSVs, one of the proxy nodes is selected (e.g., randomly) and assigned to the CSV with the smallest sized backup. A second proxy node is selected and assigned to the CSV with the next largest data size. This process is repeated until all proxy nodes are associated (or have ownership) of one of the CSVs associated with backup operation. After all of the proxy nodes have been assigned to a CSV and if additional CSVs remain to be assigned, another iteration of assignments begins by assigning the next CSV to the proxy node 204. In this manner, the CSVs are assigned to the proxy nodes based on the size of the data to be backed up from the CSVs. This occurs until all of the CSVs are assigned. The backup operation may then occur in parallel.

One advantage of assigning the CSVs to the proxy nodes in this manner is that the total amount of data to be backed up is balanced among the proxy nodes. More specifically, the first CSV with the smallest backup size is assigned to the proxy node 204. The second CSV with the next largest backup size is then assigned. The remaining CSVs are then assigned to the proxy nodes based on the size of the anticipated backup. This process is repeated until all of the CSVs are assigned to the proxy nodes.

This process of assigning the CSVs to the proxy nodes can balance the backup load. For example, if two CSVs are assigned to the proxy node 204 and only one CSV is assigned to the proxy node 206, the overall backup load is balanced across the proxy nodes because of the way that the CSVs were assigned to the proxy nodes. More specifically, in this example where three CSVs were assigned to two proxy nodes 204 and 206, the proxy node 204 is associated the CSV having the smallest amount of data to be backed up and the CSV having the largest amount of data to be backed up. The proxy node 206 has the middle amount of data. As a result, even if the proxy nodes do not have the same portion of the backup load, the backup loads of the proxy nodes are more balanced. In one example, the CSVs are assigned to the proxy nodes based on ascending data size of the backup in a round robin fashion. The CSVs could also be assigned in a similar manner, but beginning with the largest backup size, although the backup load in this example may not be as balanced. The backup load could also be balanced by creating additional proxy nodes if necessary such that the overall backup load of each proxy node can be reduced. There is no requirement that all proxy nodes participate in any given backup/restore operation.

The backup load could also be balanced by taking existing configurations into account. For example, if a proxy node already has ownership of a CSV, then the balancing process could ensure that that proxy node performs a backup operation for the virtual machines that correspond to that CSV.

In another optimization, when the number of CSVs is the same as the number of proxy nodes, each proxy node is assigned to one of the CSVs and the backup operation can proceed after the proxy nodes have ownership of the CSVs involved in the backup operation. When the number of CSVs is less than the number of proxy nodes, some of the proxy nodes may not be used for the backup operation.

The number of proxy nodes in the cluster 200 can also vary. The agent 224, for example, could be loaded on the node 202 such that the node 202 becomes a proxy node. The agents can be loaded on other nodes or removed from nodes. In addition, an agent may migrate from one node to another. As a result, the nodes serving as proxy nodes for backup/restore operations can change and vary within the same cluster.

FIG. 2 illustrates that agents 224 and 230 are installed on the nodes 204 and 206, respectively. However, the agents 224 and/or the agent 230 can backup any of the virtual machines operating on any of the nodes in the cluster 200 by utilizing the frame work 242. As described above, the backup load associated with backing up multiple virtual machines in the cluster 200 can be balanced across the agents 224 and 230 on the proxy nodes 204 and 206.

Figure 3:
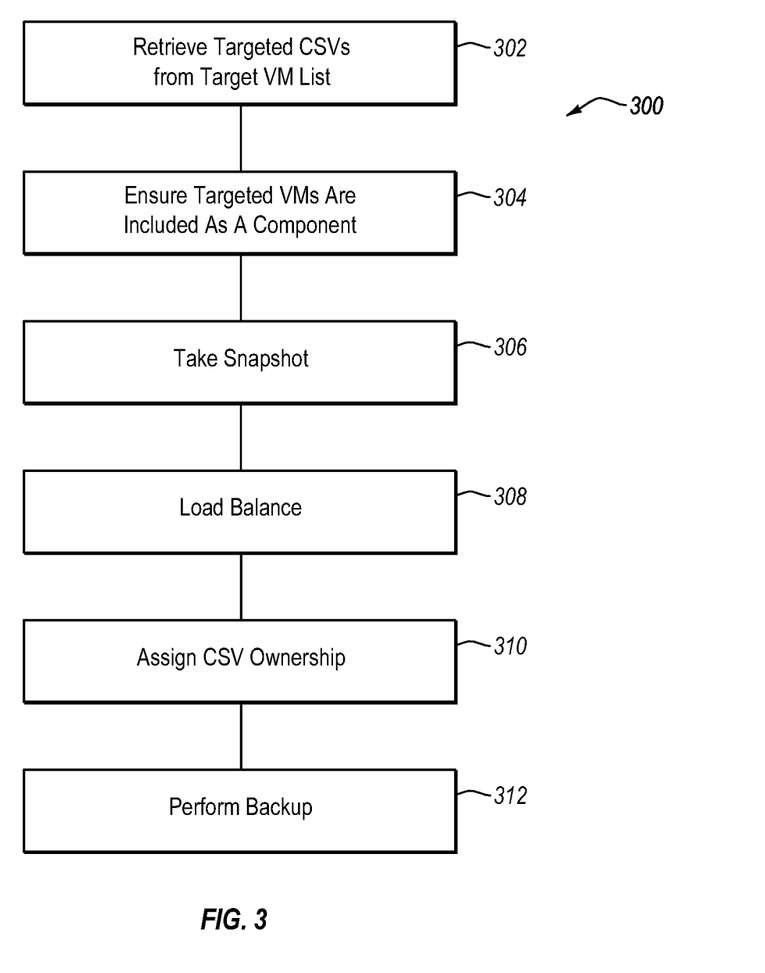
FIG. 3 illustrates an example of a method for performing a backup operation in a computing environment such as a cluster.

FIG. 3 illustrates an example of a method for performing a backup operation. More specifically, FIG. 3 illustrates an example of a method for backing up multiple virtual machines that are running on multiple nodes from one or more proxy nodes. In box 302, a list of targeted CSVs is formulated based on a list of virtual machines to be backed up. Embodiments of the invention may begin the backup operation from the perspective of the virtual machines operating in the cluster. A list of virtual machines may be presented in the user interface 242 and some of the virtual machines can be selected. The user interface 242 can be used to identify virtual machines to be backed up. The virtual machines to be backed up, however, can also be identified according to another criteria such as an automatic backup schedule or the like. More generally, the system can be configured such that the virtual machines all backed up according to a predetermined and/or automated schedule. The virtual machines do not all need to be backed up at the same time, however.

From the list of virtual machines, the CSVs associated with the list of virtual machines are identified in box 302. In box 304, the agent may ensure that the virtual machines are included as a component of the backup operation.

In box 306, a snapshot is taken of the targeted CSVs previously identified. The snapshot of the CSVs may be performed by the framework or by a service of an operating system. After the snapshot of the targeted CSVs has been taken, the resulting components are reported to the agent on the primary proxy node. For example, the agent typically receives a report from the framework that identifies certain components that should be backed up such as the snapshot, an incremental snapshot, a configuration, and the like. The agent ensures that these components are included in the backup of the corresponding virtual machine.

Then, the backup load of the backup operation is balanced in box 308 across available proxy nodes or across selected proxy nodes. The number of proxy nodes that participate in the backup operation can vary and may depend on the number of CSVs that have been identified in box 302. Balancing the backup load can include multiple acts or steps. For example, the size or amount of data on each CSV to be backed up may be determined, and the location of virtual machines is also determined. The backup load can be balanced by assigning the targeted CSVs to the available proxy nodes. The CSVs may be assigned according to size of the data to be backed up, based on the number of CSVs relative to the number of proxy nodes, or on another basis or on a combination thereof.

Once the CSVs are assigned to the proxy nodes and the proxy nodes have assumed ownership of the associated CSVs, the backup of the virtual machines is performed in box 312. This can include backing up the various components of a virtual machine such as the VHD, aVHD, configuration files, or the like. The components are may be grouped as a save set. In one example, the backup includes a save set for each virtual machine that was backed up.

Figure 4:
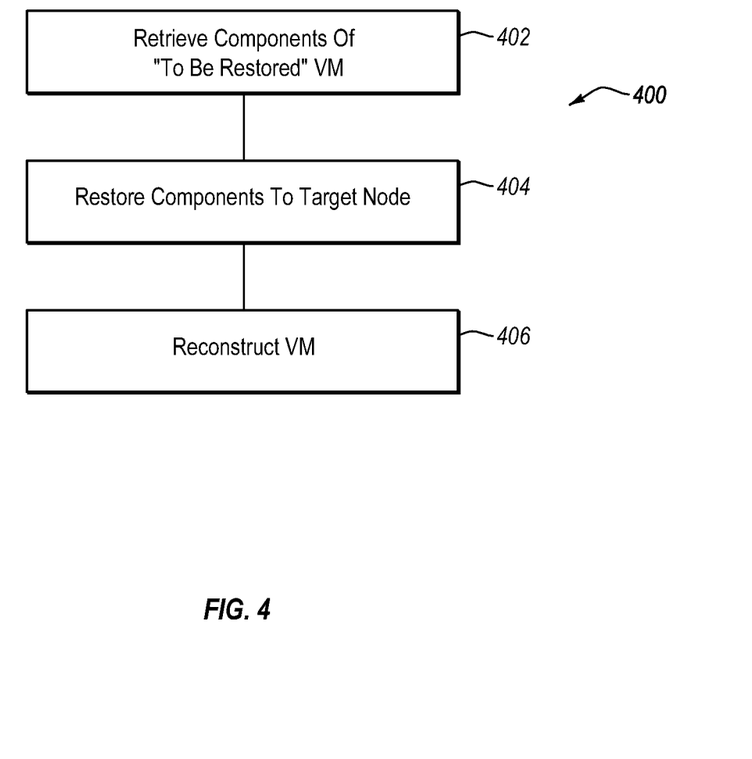
FIG. 4 illustrates an example of a method for restoring data in a computing environment such as a cluster.

FIG. 4 illustrates an example of a method for restoring data or a method for restoring a virtual machine. Generally, restoring a virtual machine involves preparing a "to be restored" or a "planned virtual machine" and then converting the planned machine into an active virtual machine.

In box 402, components of a "to be restored virtual machine" or a "planned virtual machine" are retrieved in cooperation with a backup server from a backup location. This may include retrieving the components of a virtual machine to a location. The components may be retrieved from a save set. In one example, the components actually retrieved may depend on the state to which the virtual machine is restored. If the virtual machine is restored to a less recent version, then all of the backup components included in the save set may not be necessary. An incremental backup, for example, may not be relevant to a particular restore operation.

In box 404, the components are restored. Restoring the components of the "to be restored virtual machine" can include removing the virtual machine from the target node if the virtual machine still exists on the target node. More generally, the virtual machine to be restored is first removed from the cluster prior to restoring the virtual node from a backup location even if the virtual machine is not instantiated on the destination node.

Next, the virtual machine is reconstructed in box 406. This can include creating the virtual machine from the components that have been restored. The data and the configuration data included in the restored components can be used to configure the virtual machine. Then, the virtual machine is converted to an active virtual machine such that the "to be restored" virtual machine becomes a real virtual machine. The virtual machine may also be enabled as a cluster virtual machine. Finally, the virtual machine may be migrated to a specified node in the cluster or migrated to the destination node. In some examples, the restoration of the virtual machines can be performed from a proxy node and without involving the framework of the operating system.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for backing up virtual machines in a computing environment where the virtual machines are instantiated on one or more nodes in a cluster that includes proxy nodes, the method comprising:
identifying, by a processor, virtual machines to be backed up by proxy nodes that are configured to backup the virtual machines;
identifying, by the processor, cluster shared volumes associated with the virtual machines to be backed up;
taking, by the processor, a snapshot of the identified cluster shared volumes;
determining, by the processor, a backup load associated with backing up the virtual machines;
balancing, by the processor, the backup load across the proxy nodes, based on a size of the backup load, a number of the identified cluster shared volumes, and a number of the virtual machines; and
performing, by the processor, a backup operation through the proxy nodes.

2. The method of claim 1, further comprising assigning, by the processor, ownership of the identified cluster shared volumes to the proxy nodes such that physical disks associated with the identified cluster shared volumes are accessible to the proxy nodes.

3. The method of claim 2, wherein ownership of the identified cluster shared volumes is distributed to the proxy nodes.

4. The method of claim 1, wherein the identified cluster shared volumes includes at least a first shared volume and a second shared volume.

5. The method of claim 1, further comprising balancing, by the processor, the backup load based on at least the number of the virtual machines relative to the number of the identified cluster shared volumes.

6. The method of claim 1, further comprising balancing, by the processor, the backup load based on at least the number of the identified cluster shared volumes relative to a number of the proxy nodes.

7. The method of claim 1, further comprising balancing, by the processor, the backup load based on a size of data on each of the identified cluster shared volumes.

8. The method of claim 1, wherein when a number of the proxy nodes is less than the number of the identified cluster shared volumes, assigning, by the processor, a first cluster shared volume having a smallest data size to a first proxy node and assigning, by the processor, a second cluster shared volume having a next smallest data size to a second proxy node.

9. The method of claim 8, further comprising assigning, by the processor, all of the identified cluster shared volumes to the proxy nodes based on data size until all of the identified cluster shared volumes are assigned such that the backup load is balanced.

10. The method of claim 1, further comprising reducing, by the processor, the backup load of each proxy node by adding additional proxy nodes and redistributing, by the processor, the backup load such that all of the proxy nodes including the added additional proxy nodes have a part of the backup load.

11. The method of claim 1, further comprising accounting, by the processor, for existing configurations such that any of the proxy nodes having ownership of a cluster shared volume performs a backup operation for the virtual machines associated with an already owned cluster shared volume.

12. The method of claim 1, wherein the backup operation includes backing up components of the virtual machines, and wherein the component backups of the virtual machines are generated during the backup operation.

13. A method for backing up virtual machines in a computing environment where the virtual machines are instantiated on one or more nodes in a cluster that includes proxy nodes, the method comprising:
identifying, by the processor, virtual machines to be backed up by proxy nodes that are configured to backup the virtual machines;
identifying, by the processor, cluster shared volumes associated with the virtual machines to be backed up;
taking, by the processor, a snapshot of the identified cluster shared volumes;
determining, by the processor, a backup load associated with backing up the virtual machines associated with the identified virtual machines;
balancing, by the processor, the backup load across the proxy nodes such that the backup load is distributed to the proxy nodes, based on a size of the backup load, a number of the identified cluster shared volumes, and a number of the virtual machines;
assigning, by the processor, ownership of the identified cluster shared volumes to the proxy nodes after the backup load is balanced such that each of the proxy nodes owns the identified cluster shared volumes associated with the virtual machines to be backed up by each of the proxy nodes; and
performing, by the processor, a backup operation through the proxy nodes.

14. The method of claim 13, further comprising receiving, by the processor, input identifying the virtual machines to be backed up.

15. The method of claim 13, wherein taking the snapshot of the identified cluster shared volumes comprises requesting, by the processor, a framework associated with an operating system to take the snapshot of the identified cluster shared volumes.

16. The method of claim 13, further comprising quiescing, by the processor, the identified cluster shared volumes before the snapshot of the identified cluster shared volumes is taken.

17. The method of claim 13, wherein the proxy nodes include a primary proxy node, and wherein an agent running on the primary proxy node ensures that component backups of the virtual machines are included in the backups of the virtual machines.

18. The method of claim 13, further comprising balancing, by the processor, the backup load based on the number of the identified cluster shared volumes relative to a number of the proxy nodes and a size of data on each of the identified cluster shared volumes.

19. The method of claim 18, wherein when the number of the proxy nodes is less than the number of the identified cluster shared volumes, assigning, by the processor, a first cluster shared volume having a smallest data size to a first proxy node and assigning, by the processor, a second cluster shared volume having a next smallest data size to a second proxy node.

20. The method of claim 13, wherein the identified cluster shared volumes are assigned to the proxy nodes in a round robin fashion based on a size of data of each identified cluster shared volume and beginning with a smallest data size such that, after all of the identified cluster shared volumes are assigned to the proxy nodes, the backup load is balanced even if not equal.

\* \* \* \* \*